United States Patent
Kuehbacher et al.

(10) Patent No.: US 12,244,176 B2
(45) Date of Patent: Mar. 4, 2025

(54) STATOR OF AN ELECTRIC MACHINE

(71) Applicant: Robert Bosch GmbH, Stuttgart (DE)

(72) Inventors: Daniel Kuehbacher, Stuttgart (DE); Felix Bensing, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 232 days.

(21) Appl. No.: 17/922,136

(22) PCT Filed: Mar. 22, 2021

(86) PCT No.: PCT/EP2021/057218
§ 371 (c)(1),
(2) Date: Oct. 28, 2022

(87) PCT Pub. No.: WO2021/219293
PCT Pub. Date: Nov. 4, 2021

(65) Prior Publication Data
US 2023/0179036 A1    Jun. 8, 2023

(30) Foreign Application Priority Data
Apr. 29, 2020  (DE) ............ 10 2020 205 448.7

(51) Int. Cl.
*H02K 1/16* (2006.01)
*H02K 3/12* (2006.01)
(Continued)

(52) U.S. Cl.
CPC ........... *H02K 1/165* (2013.01); *H02K 3/12* (2013.01); *H02K 3/345* (2013.01); *H02K 15/024* (2013.01); *H02K 15/085* (2013.01); *H02K 15/10* (2013.01)

(58) Field of Classification Search
CPC .... H02K 15/024; H02K 15/085; H02K 15/10; H02K 3/345
See application file for complete search history.

(56) References Cited

U.S. PATENT DOCUMENTS

2011/0133580 A1   6/2011  Sugimoto et al.
2012/0256512 A1  10/2012  Fubuki et al.
(Continued)

FOREIGN PATENT DOCUMENTS

DE  102020205448 A1 * 11/2021 ............... H02K 1/16
FR      2494926 A1     5/1982
(Continued)

OTHER PUBLICATIONS

Translated abstract of JP2018-16374 (Year: 2018).*
Translation of International Search Report for Application No. PCT/EP2021/057218 dated Jul. 6, 2021 (2 pages).

*Primary Examiner* — Forrest M Phillips
(74) *Attorney, Agent, or Firm* — Michael Best & Friedrich LLP

(57) ABSTRACT

The invention relates to a stator of an electric machine, comprising:—a laminated stator core (3), which has a stator axis (2), comprises a plurality of stator teeth (5) and a plurality of stator slots (6) formed between the stator teeth (5), and is formed by a plurality of stacked stator laminations (4); and —electrical conductor elements (10), which run through the stator slots (6) of the laminated stator core (3) and are provided in order to form an electrical winding, more particularly a plug-in winding. In each of the stator slots (6), a slot insulator (11), more particularly a slot insulation paper, is provided in order to electrically insulate the conductor elements (10) from the laminated stator core (3). The stator laminations (4) each have a plurality of lamination teeth (7) and a lamination yoke (8), which connects the lamination teeth (7). The stator teeth (5) of the laminated stator core (3) are each formed by stacked lamination teeth (7) of the stator laminations (4). The stator is characterized in that, in the laminated stator core (3), at least one stator lamination (4) is provided which is rotated in peripheral direction with respect to the stator axis (2), (Continued)

relative to other of the stator laminations (4) of the laminated stator core (3), such that, in each stator slot (6) of the laminated stator core (3), a lamination tooth portion (12) of one of the lamination teeth (7) of said stator lamination protrudes into the stator slot (6).

12 Claims, 4 Drawing Sheets

(51) Int. Cl.
*H02K 3/34* (2006.01)
*H02K 15/02* (2006.01)
*H02K 15/085* (2006.01)
*H02K 15/10* (2006.01)

(56) References Cited

U.S. PATENT DOCUMENTS

| | | | | |
|---|---|---|---|---|
| 2018/0358849 | A1* | 12/2018 | Saint-Michel | H02K 7/14 |
| 2019/0207444 | A1* | 7/2019 | Wolf | H02K 1/28 |
| 2019/0356181 | A1* | 11/2019 | Sturm | H02K 15/10 |
| 2021/0184518 | A1* | 6/2021 | Ronning | H02K 1/20 |
| 2022/0311297 | A1* | 9/2022 | Hinrich | H02K 1/165 |
| 2023/0028465 | A1* | 1/2023 | Feng | H02K 9/227 |

FOREIGN PATENT DOCUMENTS

| | | | |
|---|---|---|---|
| JP | 2018164374 A | * | 10/2018 |
| WO | 2019142663 A1 | | 7/2019 |
| WO | WO-2022207440 A1 | * | 10/2022 |

* cited by examiner

STATOR OF AN ELECTRIC MACHINE

BACKGROUND

The invention proceeds from a stator of an electric machine.

A stator of an electric machine having a laminated stator core, which comprises a stator axis, a plurality of stator teeth and a plurality of stator slots formed between the stator teeth and is formed by a plurality of stacked stator laminations, and having electrical conductor elements, which extend through the stator slots of the laminated stator core and are provided to form an electrical winding, in particular a plug-in winding, wherein a slot insulation, in particular a slot insulation paper, is respectively provided in the stator slots for electrical insulation of the conductor elements against the laminated stator core, wherein each of the stator laminations comprises a plurality of lamination teeth and a lamination yoke which connects said lamination teeth and wherein the stator teeth of the laminated stator core are respectively formed by stacked lamination teeth of the stator laminations is already known from US2012256512 A1.

A gap is created in each case in the stator slots between the conductor elements and the laminated stator core or between the conductor elements and the respective slot insulation, which depends, among other things, on the manufacturing tolerance of the width of the stator slots and the manufacturing tolerance of the width of the conductor elements. This gap, which is an air gap, possibly filled with an impregnating agent, worsens the transfer of heat from the conductor elements to the laminated stator core.

SUMMARY

In contrast, the stator of the electric machine according to the invention having the characterizing features of the main claim has the advantage that the transfer of heat from the conductor elements to the laminated stator core, and thus the cooling of the electrical winding, is improved. The power of the electric machine can consequently be increased. The mechanical fixing of the conductor elements in the stator slot is additionally improved as well, so that an impregnation of the conductor elements in the stator slot could be omitted. And the manufacturing tolerances for the stator laminations and for the conductor elements can be expanded, so that the manufacturing costs for the stator are reduced.

These advantages are achieved according to the invention, by providing at least one stator lamination in the laminated stator core which is twisted in peripheral direction with respect to the stator axis relative to others of the stator laminations of the laminated stator core such that, in each stator slot of the laminated stator core, it projects into the respective stator slot with a lamination tooth portion of one of the lamination teeth. The projecting lamination tooth portions form projecting ribs in the stator slots, which have no or only a small gap to the conductor elements.

Advantageous further developments and improvements of the stator specified in the main claim are possible as a result of the measures listed in the subclaims.

It is advantageous that the respective twisted stator lamination in each stator slot projects into the respective stator slot with the lamination tooth portion on one of the two stator teeth which delimit the respective stator slot and that a recess having a negative contour which corresponds to the projecting lamination tooth portion is formed on the other stator tooth which delimits the respective stator slot.

It is particularly advantageous if a plurality of stator laminations are twisted in peripheral direction with respect to the stator axis relative to others of the stator laminations of the laminated stator core, in particular in the same twist direction. The transfer of heat from the conductor elements to the laminated stator core and also the mechanical fixing of the conductor elements in the respective stator slot are thus improved even further.

It is also advantageous if the plurality of twisted stator laminations in the laminated stator core are disposed in a plurality of spaced-apart groups of abutting stator laminations, wherein one or more non-twisted stator laminations are disposed in each case between two groups of twisted stator laminations.

According to a first design example, the plurality of twisted stator laminations in the laminated stator core are disposed in a plurality of, spaced-apart groups of abutting stator laminations, wherein one or more non-twisted stator laminations are disposed in each case between two groups of twisted stator laminations.

According to a second design example, the plurality of twisted stator laminations in the laminated stator core are disposed singly, wherein one or more non-twisted stator laminations are disposed in each case between two twisted stator laminations.

It is also advantageous if the plurality of twisted stator laminations of the laminated stator core are all twisted by the same angle of twist or respectively by a different angle of twist which increases in axial direction with respect to the stator axis. In this way, either a non-skewed stator or a skewed stator is achieved.

It is also advantageous if the stator slots provided with the conductor elements comprise cavities which are filled at least partially with an impregnating agent.

It is furthermore advantageous if the stator laminations of the laminated stator core are joined to one another, in particular welded, and/or form a press fit on the outer periphery with a stator housing of the electric machine and/or are clamped in axial direction with respect to the stator axis between two bearing shields of the stator housing. The stator laminations of the laminated stator core are thus fixed in their position.

The invention further proceeds from a method for producing the stator or the electric machine. According to the invention, it is provided that, after inserting the conductor elements and prior to fixing the stator laminations, at least one stator lamination of the laminated stator core is twisted in peripheral direction with respect to the stator axis relative to others of the stator laminations of the laminated stator core such that, in each stator slot of the laminated stator core, it projects into the respective stator slot with a lamination tooth portion of one of the lamination teeth.

BRIEF DESCRIPTION OF THE DRAWINGS

Two design examples of the invention are shown in simplified form in the drawings and explained in more detail in the following description.

DETAILED DESCRIPTION

Figure 1:
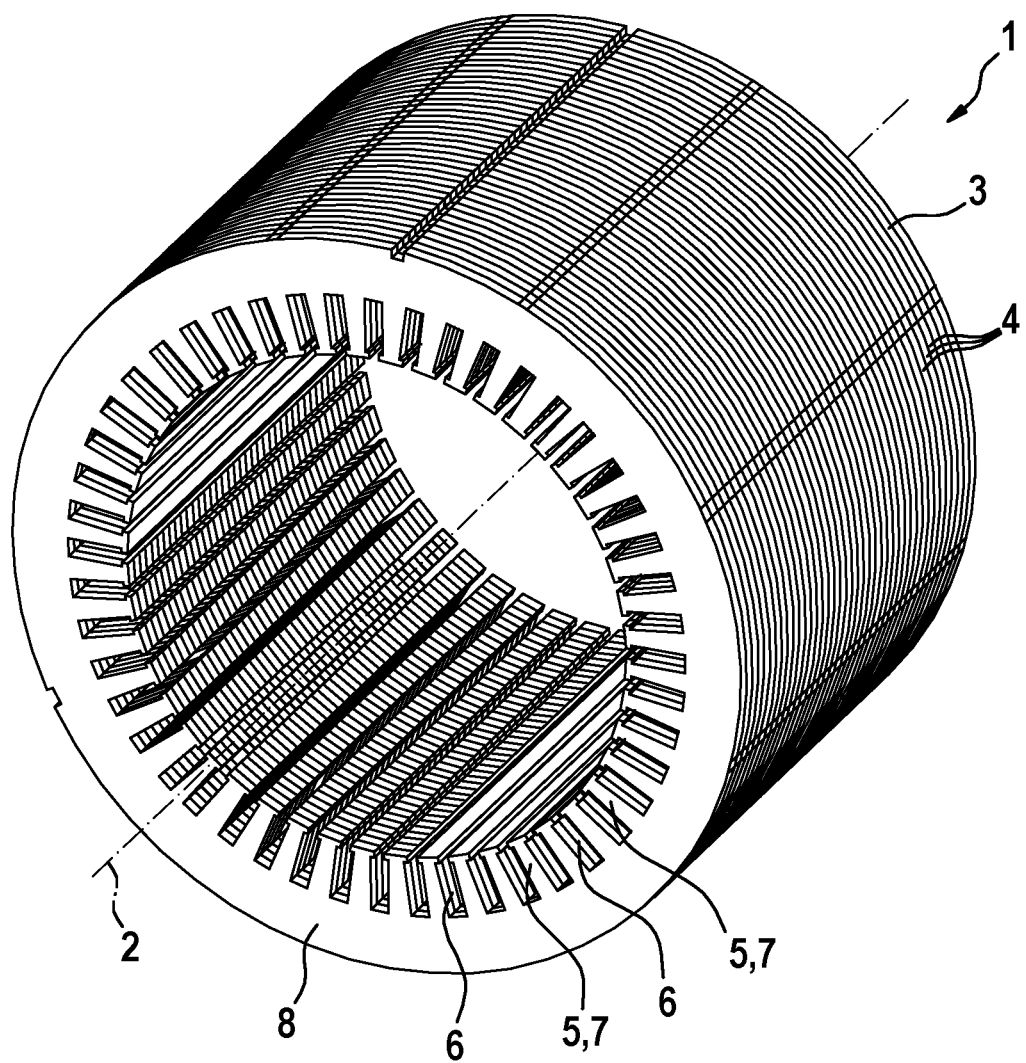
FIG. 1 shows a stator according to the invention of an electric machine.

FIG. 1 shows a stator according to the invention.

The stator 1 of an electric machine comprises at least one laminated stator core 3 which is formed of a stack of stator laminations 4 and comprises a stator axis 2. The stator 1 or the laminated stator core 3 comprises a plurality of stator teeth 5 and a plurality of stator slots 6 disposed between the stator teeth 5. The stator slots 6 are respectively formed between two stator teeth 5.

Each of the stator laminations 4 comprises a plurality of lamination teeth 7 and a lamination yoke 8 which connects said lamination teeth 7 to one another. The stator teeth 5 of the laminated stator core 3 are respectively formed by stacked lamination teeth 7 of the stator laminations 4.

Figure 2:
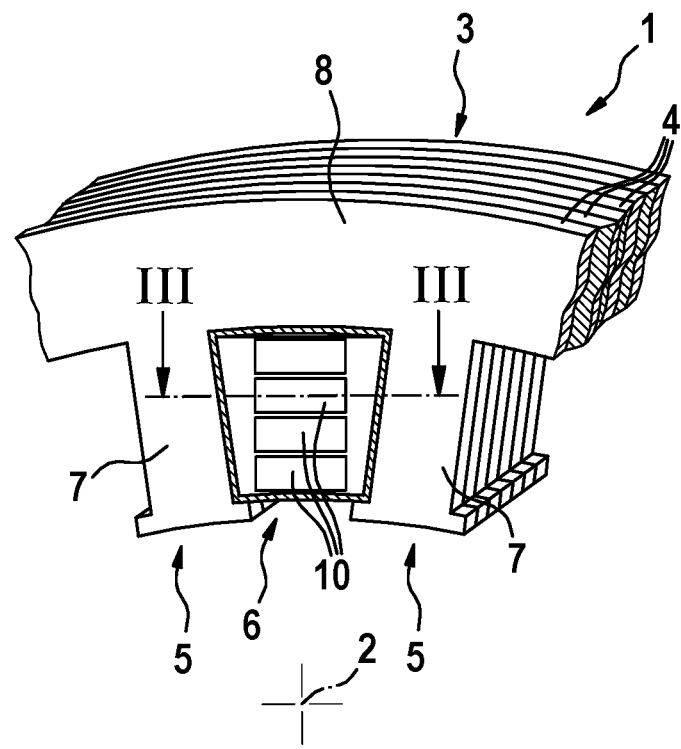
FIG. 2 a partial view of the stator of FIG. 1 in an unfinished state.
Figure 3:
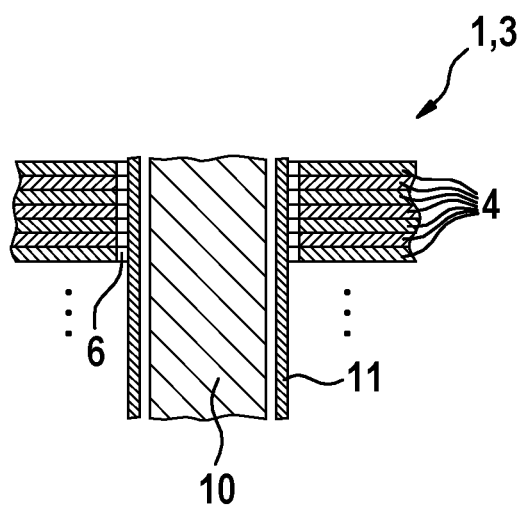
FIG. 3 a sectional view of a section through the unfinished laminated stator core along the section line in FIG. 2, FIG. 4 a partial view of a first design example of stator according to the invention of FIG. 1, FIG. 5 a sectional view of a section through the laminated stator core along the section line V-V of FIG. 4, FIG. 6 a partial view of a second design example of the stator according to the invention of FIG. 1 and FIG. 7 a sectional view of a section through the laminated stator core along the section line VII-VII of FIG. 6.

FIG. 2 shows a partial view of the stator of FIG. 1 in an unfinished state, in which the stator laminations 4 are still lying loosely on top of one another and all lamination teeth 7 of each individual stator tooth 5 of the laminated stator core 3 are disposed in alignment with one another, as can be seen in the sectional view according to FIG. 3.

FIG. 3 shows a sectional view according to a section through the unfinished laminated stator core 3 along the section line in FIG. 2.

As before, the stator 1 comprises electrical conductor elements 10 that extend through the stator slots 6 of the laminated stator core 3 and are provided to form an electrical winding, for example a plug-in winding. The conductor elements 10 respectively have a quadrangular, in particular rectangular, cross-section, for example, and are implemented, for example, as so-called hairpins or as so-called I-pins.

A slot insulation 11, for example, for example a slot insulation paper, is provided in the stator slots 6 for electrical insulation of the conductor elements 10 against the laminated stator core 3.

The stator slots 6 provided with the conductor elements 10 comprise cavities 9 which, in the finished state of the stator 1, can be filled at least partially with an impregnating agent 16.

Figure 4:
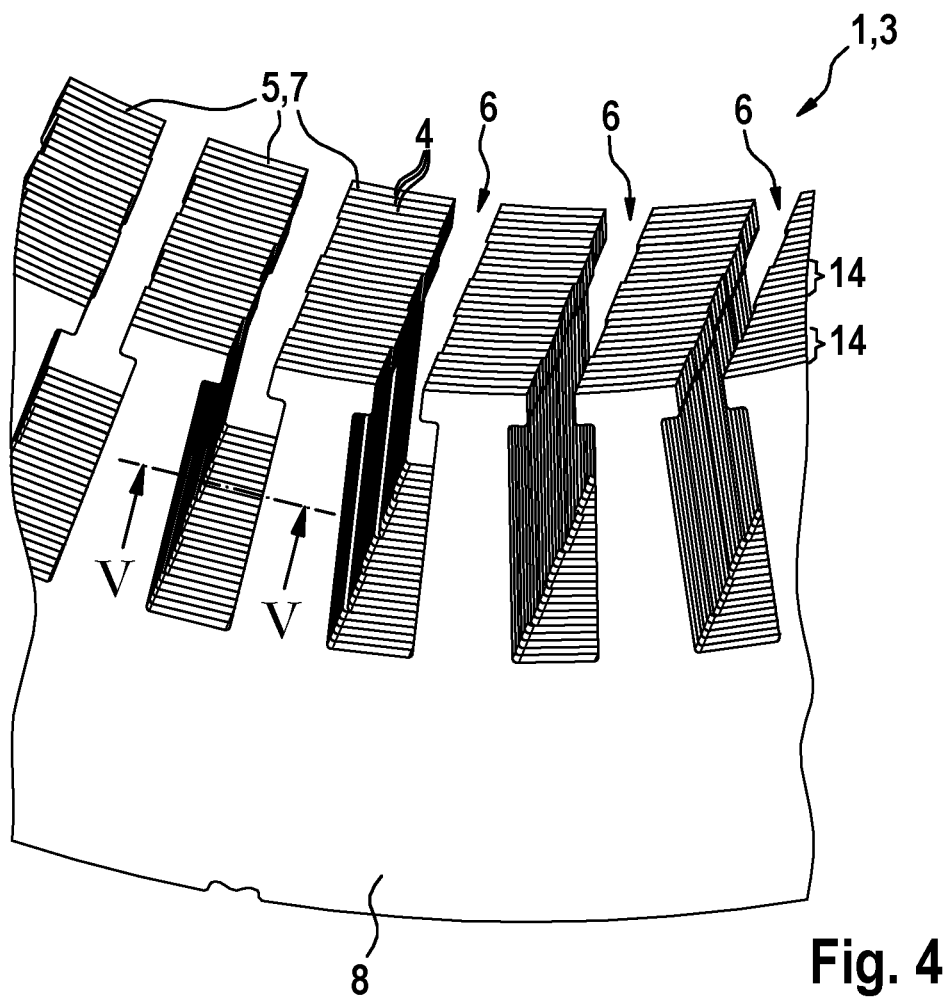

FIG. 4 shows a partial view of a first design example of stator according to the invention of FIG. 1.

Figure 5:
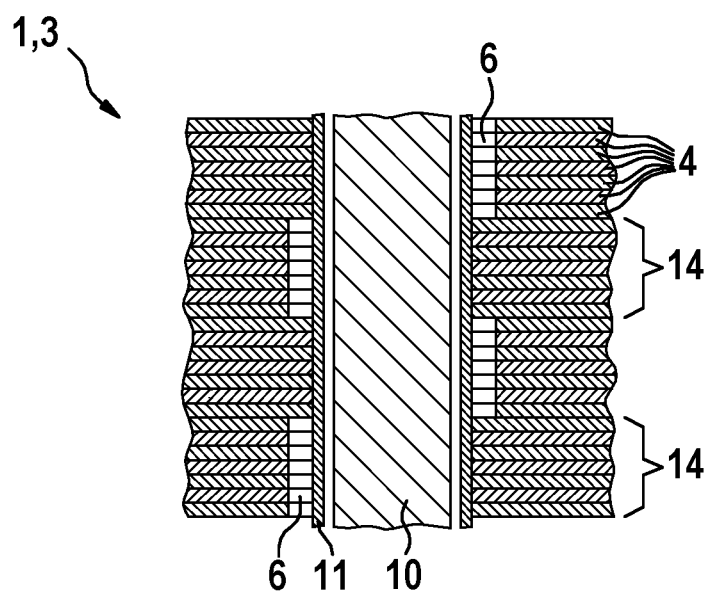

FIG. 5 shows a sectional view of a section through the laminated stator core along the section line V-V in FIG. 4, wherein the sectional view additionally shows the slot insulation 11 and one of the conductor elements 10.

According to the invention, it is provided that at least one stator lamination 4 is provided in the laminated stator core 3 which is twisted in peripheral direction with respect to the stator axis 2 relative to others of the stator laminations 4 of the laminated stator core 3 such that, in each stator slot 6 of the laminated stator core 3, it projects into the respective stator slot 6 with a lamination tooth portion 12 of one of the lamination teeth 7.

In each stator slot 6, the respective twisted stator lamination 4 projects into the respective stator slot 6 with the lamination tooth portion 12 on one of the two stator teeth 5 which delimit the respective stator slot 6 and a recess 13 having a negative contour which corresponds to the projecting lamination tooth portion 12 is formed on the other stator tooth 5 which delimits the respective stator slot 6.

According to the design examples in FIG. 4 to FIG. 7, a plurality of stator laminations 4 in the laminated stator core 3 are twisted in peripheral direction with respect to the stator axis 2 relative to others of the stator laminations 4 of the laminated stator core 3, for example in the same twist direction.

According to the first design example of FIG. 4 and FIG. 5, the plurality of twisted stator laminations 4 in the laminated stator core 3 are disposed in a plurality of spaced-apart groups 14 of abutting stator laminations 4, wherein one or more non-twisted stator laminations 4 are disposed in each case between two groups 14 of twisted stator laminations 4.

Figure 6:
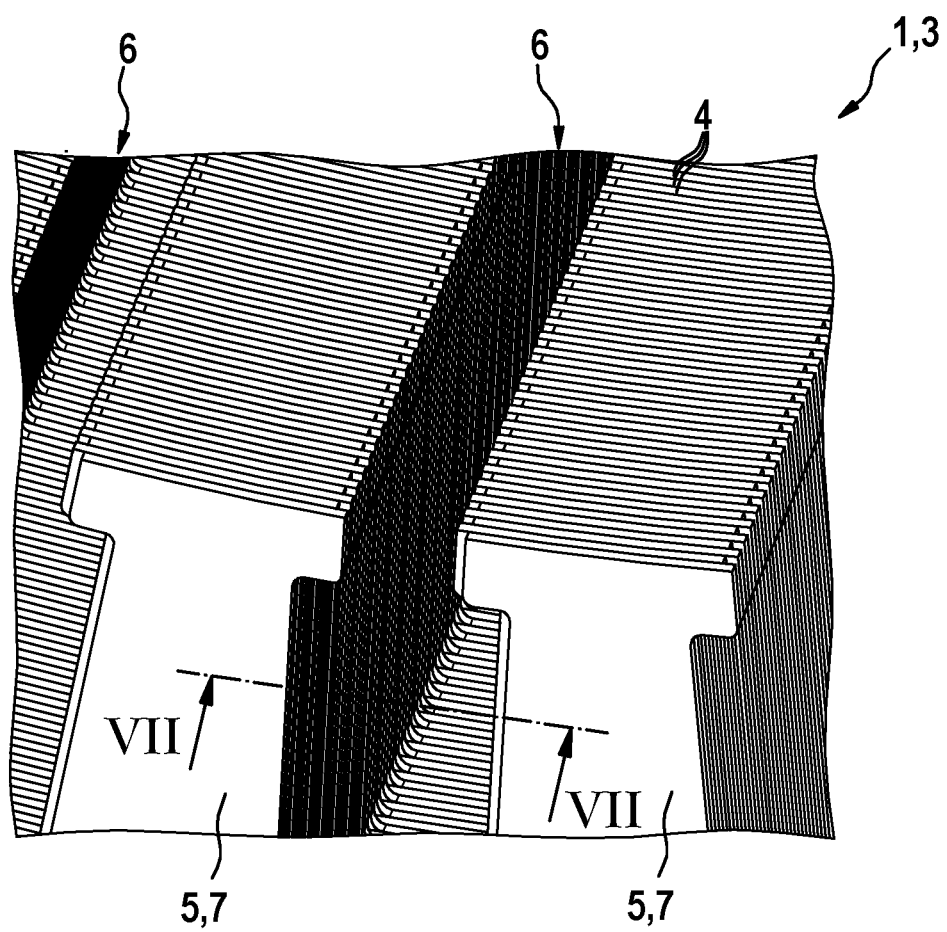

FIG. 6 shows a partial view of a second design example of the stator according to the invention of FIG. 1.

Figure 7:
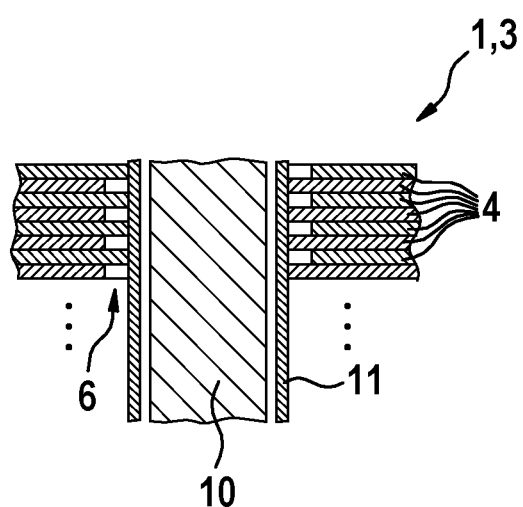

FIG. 7 shows a sectional view of a section through the laminated stator core along the section line VII-VII in FIG. 6, wherein the sectional view additionally shows the slot insulation 11 and one of the conductor elements 10.

According to the second design example, the plurality of twisted stator laminations 4 in the laminated stator core 3 are disposed singly, wherein one or more non-twisted stator laminations 4 are disposed in each case between two twisted stator laminations 4.

The plurality of twisted stator laminations 4 of the laminated stator core 3 are all twisted by the same angle of twist, for example. To obtain a skewed stator 1, the plurality of twisted stator laminations 4 of the laminated stator core 3 can alternatively also respectively be twisted by a different angle of twist which increases in axial direction with respect to the stator axis 2.

The following steps are carried out to produce the stator 1 according to the invention:

a. stacking the stator laminations 4 to form a laminated stator core 3,
b. optionally inserting the slot insulation 11 into the stator slots 6,
c. inserting the conductor elements 10 into the respective stator slots 6,
d. fixing the stator laminations 4 of the laminated stator core 3, for example joining, in particular welding the stator laminations 4.

According to the invention, in terms of time after inserting the conductor elements 10 (Step c) and prior to fixing the stator laminations 4 (Step d), at least one stator lamination 4, for example a plurality of stator laminations 4, of the laminated stator core 3 is twisted in peripheral direction with respect to the stator axis 2 relative to others of the stator laminations 4 of the laminated stator core 3 such that, in each stator slot 6 of the laminated stator core 3, it projects into the respective stator slot 6 with a lamination tooth portion 12 of one of the lamination teeth 7.

The invention claimed is:

1. A stator of an electric machine having a laminated stator core (3), which comprises a stator axis (2), a plurality of stator teeth (5) and a plurality of stator slots (6) formed between the stator teeth (5) and is formed by a plurality of stacked stator laminations (4), and having electrical conductor elements (10), which extend through the stator slots (6) of the laminated stator core (3) and are provided to form an electrical winding, wherein a slot insulation (11) is respectively provided in the stator slots (6) for electrical insulation of the conductor elements (10) against the laminated stator core (3), wherein each of the stator laminations (4) comprises a plurality of lamination teeth (7) and a lamination yoke (8) which connects said lamination teeth (7), wherein the stator teeth (5) of the laminated stator core (3) are respectively formed by stacked lamination teeth (7) of the stator laminations (4), wherein
at least one stator lamination (4) is provided in the laminated stator core (3) which is twisted in peripheral direction with respect to the stator axis (2) relative to others of the stator laminations (4) of the laminated stator core (3) such that, in each stator slot (6) of the laminated stator core (3), the at least one twisted stator lamination (4) projects into the respective stator slot (6) with a lamination tooth portion (12) of one of the lamination teeth (7),
wherein a plurality of stator laminations (4) in the laminated stator core (3) are twisted in peripheral direction with respect to the stator axis (2) relative to others of the stator laminations (4) of the laminated stator core (3),
wherein the plurality of twisted stator laminations (4) in the laminated stator core (3) are disposed in a plurality of spaced-apart groups (14) of abutting stator laminations (4), wherein one or more non-twisted stator laminations (4) are disposed in each case between two groups (14) of twisted stator laminations (4), and
wherein the two groups (14) of twisted stator laminations (4) are twisted by the same twist angle.

2. The stator according to claim 1, wherein the respective twisted stator lamination (4) in each stator slot (6) projects into the respective stator slot (6) with the lamination tooth portion (12) on one of the two stator teeth (5) which delimit the respective stator slot (6) and that a recess (13) having a negative contour which corresponds to the projecting lamination tooth portion (12) is formed on the other stator tooth (5) which delimits the respective stator slot (6).

3. The stator according to claim 1, wherein the stator slots (6) provided with the conductor elements (10) comprise cavities (9) which are filled at least partially with an impregnating agent (16).

4. The stator according to claim 1, wherein the conductor elements (10) respectively have a quadrangular cross-section and are configured as a hairpin or as an I-pin.

5. An electric machine comprising a stator according to claim 1, wherein the stator laminations (4) of the laminated stator core (3) are joined to one another and/or form a press fit on an outer periphery with a stator housing (20) and/or are clamped in axial direction with respect to the stator axis (2) between two bearing shields of the stator housing (20).

6. A method for producing the stator (1) according to claim 1, comprising the steps:
  a. stacking the stator laminations (4) to form a laminated stator core (3),
  b. inserting the slot insulation (11) into the stator slots (6),
  c. inserting the conductor elements (10) into the respective stator slots (6),
  d. fixing the stator laminations (4) of the laminated stator core (3),
wherein,
after inserting the conductor elements (10) and prior to fixing the stator laminations (4), at least one stator lamination (4) of the laminated stator core (3) is twisted in peripheral direction with respect to the stator axis (2) relative to others of the stator laminations (4) of the laminated stator core (3) such that, in each stator slot (6) of the laminated stator core (3), the at least one twisted stator lamination (4) projects into the respective stator slot (6) with a lamination tooth portion (12) of one of the lamination teeth (7).

7. The method of claim 6, wherein fixing the stator laminations (4) includes joining or welding the stator laminations (4).

8. The stator according to claim 1, wherein the electrical winding is a plug-in winding.

9. The stator according to claim 1, wherein the slot insulation (11) is a slot insulation paper.

10. The stator according to claim 1, wherein the plurality of stator laminations (4) in the laminated stator core (3) are twisted in a same peripheral direction with respect to the stator axis (2) relative to others of the stator laminations (4) of the laminated stator core (3).

11. The stator according to claim 4, wherein the conductor elements (10) respectively have a rectangular cross-section.

12. The electric machine according to claim 5 wherein the stator laminations (4) of the laminated stator core (3) are welded to one another.

* * * * *